United States Patent [19]

Meyer

[11] Patent Number: 5,775,860
[45] Date of Patent: Jul. 7, 1998

[54] PLASTIC RIVET HAVING INTEGRAL DRIVE PIN AND BODY

[75] Inventor: Charles Meyer, New Lenox, Ill.

[73] Assignee: Illinois Tool Works Inc., Glenview, Ill.

[21] Appl. No.: 856,931

[22] Filed: May 15, 1997

[51] Int. Cl.[6] .............................. F16B 19/00; F16B 13/06
[52] U.S. Cl. ........................... 411/46; 411/41; 411/60; 411/508
[58] Field of Search .................... 411/40, 41, 45, 411/46, 47, 48, 59, 60, 508, 509, 510

[56] References Cited

U.S. PATENT DOCUMENTS

| 4,375,342 | 3/1983 | Wollar | 411/45 |
|---|---|---|---|
| 4,405,272 | 9/1983 | Woller | 411/45 |
| 4,571,134 | 2/1986 | Beglinger | 411/509 |
| 4,987,639 | 1/1991 | Baiuley | 411/508 |
| 5,163,795 | 11/1992 | Benoit | 411/45 |
| 5,568,675 | 10/1996 | Asami | 411/48 |

FOREIGN PATENT DOCUMENTS

| 997710 | 7/1965 | United Kingdom | 411/508 |

*Primary Examiner*—Flemming Saether
*Attorney, Agent, or Firm*—Kane, Dalsimer, Sullivan, Kurucz, Levy, Eisele and Richard, LLP

[57] ABSTRACT

A plastic rivet is composed of a resilient material and has a drive pin and a body. Drive pin has a head and a shank. Distal end of shank has a pair of resilient legs, and proximal end of shank has a transverse hole forming deflectable walls. A first pair of protrusions project radially outwardly from the legs, and a second pair of protrusions project radially outwardly from the walls. Body has a head and elongated portion insertable into holes in members to be joined. The elongated portion is comprised of a pair of outwardly tapered longitudinal members projecting from the head and interconnected by an inwardly tapered nose. Shank of drive pin is insertable into a passage which extends through the head and elongated portion of the body. When drive pin is predriven into the body, the first pair of protrusions engages into slots in the passage, retaining the drive pin within the body. As drive pin is driven into the body, legs and walls deflect inwardly. When drive pin is fully driven into body, the first pair of protrusions engage with mating surfaces formed at the distal ends of the longitudinal members, the second pair of protrusion engage with the slots, and the shank of the drive pin and the longitudinal members form a substantially solid member. Thus, the extraction of the drive pin from the body is opposed by a retention force, and extraction of the body from the holes of the joined members is opposed by a retention force.

7 Claims, 2 Drawing Sheets

PLASTIC RIVET HAVING INTEGRAL DRIVE PIN AND BODY

BACKGROUND OF THE INVENTION

1. Field of the Invention

This invention relates to a plastic rivet, and, more particularly, to a plastic rivet comprising a body having an elongated portion and a drive pin.

2. Description of the Prior Art

Plastic rivets are typically used to join two or more members. Plastic rivets generally have a pin portion drivable into a body portion. The body has a head, a shank and an axial bore in the shank for receiving the pin. The body is insertable into aligned holes in the members to be joined by the plastic rivet. The pin is driven into the axial bore of the body and causes the shank of the body to expand radially. The expansion of the shank opposes removal of the shank from the holes, thereby fastening the members.

The shank of the body of a typical plastic rivet includes two or more deflectable prongs. When a pin is fully driven into the axial bore of the body, the prongs expand to prevent extraction of the body from the aligned holes of the joined members. It is possible to deform or fracture the prongs of a typical plastic rivet upon initial insertion of the shank into the holes of members to be joined if, for example, the holes are not in perfect alignment or the diameter of the holes is smaller than that for which the fastener is rated.

Pins of plastic rivets have been known to be predriven into the body and to be frictionally retained therein such as in U.S. Pat. No. 4,830,556 for "Flexible Rivet Having Flexible Drive Pin." However, it is known that the force retaining pin within body in such plastic rivets is unacceptably low. This low retention force permits the pin in such rivets to dislocate from the body, thereby increasing installation time and cost.

The pin in prior art plastic rivets typically have a head and a shank, where the shank is insertable into the axial bore of the body. The shank of the pin of a typical plastic rivet is substantially solid. Thus, it is the shank of the body which must expand during the process of driving the pin into the body. The resultant force required to fully drive the pin into the body is, therefore, unacceptably high.

Therefore, in order to alleviate these problems, an objective of the present invention is to provide a plastic rivet in which a low insertion force is necessary to fully drive the drive pin into the body. Another objective of the present invention is to provide a plastic rivet in which a predriven drive pin is retained within the body with a high retention force. Another objective of the present invention is to provide a plastic rivet where a portion of the drive pin is partially collapsed while the drive pin is being driven into the body, thus reducing or eliminating expansion of the body. Yet another objective of the present invention is to provide a plastic rivet wherein the elongated portion of the body does not interfere with insertion of body into holes of members to be joined.

SUMMARY OF THE INVENTION

The above and other beneficial objects are obtained in accordance with the present invention by providing a plastic rivet having a drive pin and a body. The body has a head and a shank. The distal end of the shank of the body has a closed tapered nose insertable into aligned holes in members to be joined. Body has a longitudinal passage extending through the head and shank. The drive pin also has a head and a shank, the shank being insertable into the passage of the body. The distal end of the shank of the drive pin has flexible legs which have protrusions for engaging with mating surfaces in the shank of the body. The drive pin is inserted into the longitudinal passage of the body, preventing the collapse of the body, thus preventing extraction of the body from the joined members.

DETAILED DESCRIPTION OF THE PREFERRED EMBODIMENTS

The aforementioned figures illustrate a plastic rivet 10 in which identical numerals in each figure represent identical elements.

Figure 1:
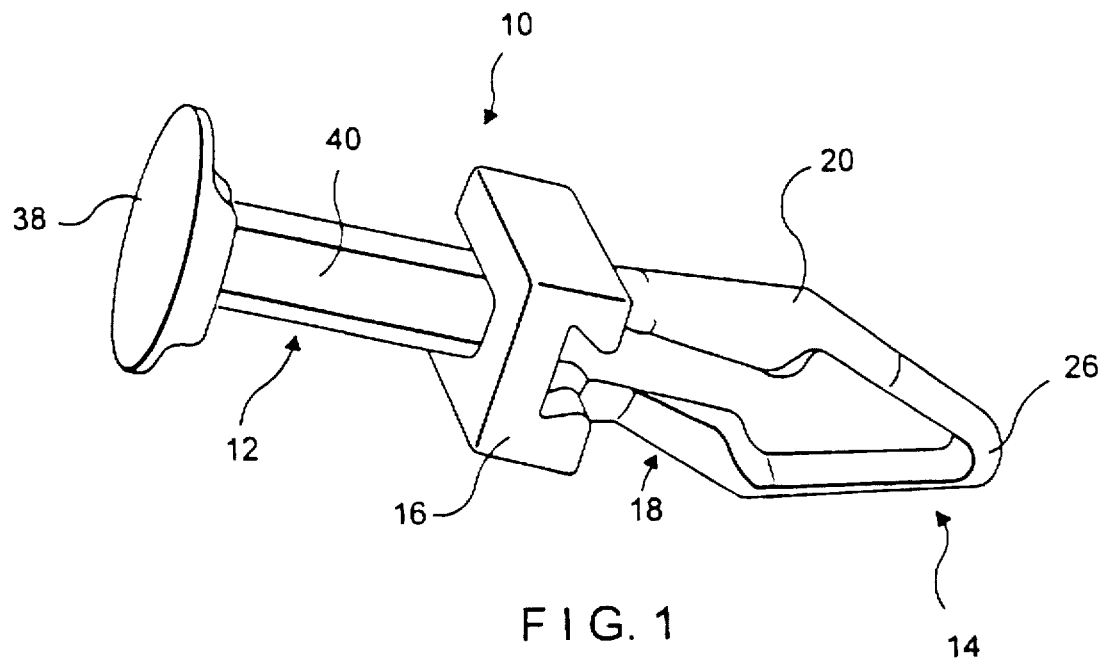
FIG. 1 is a perspective view of a plastic rivet according to the present invention.
Figure 2:
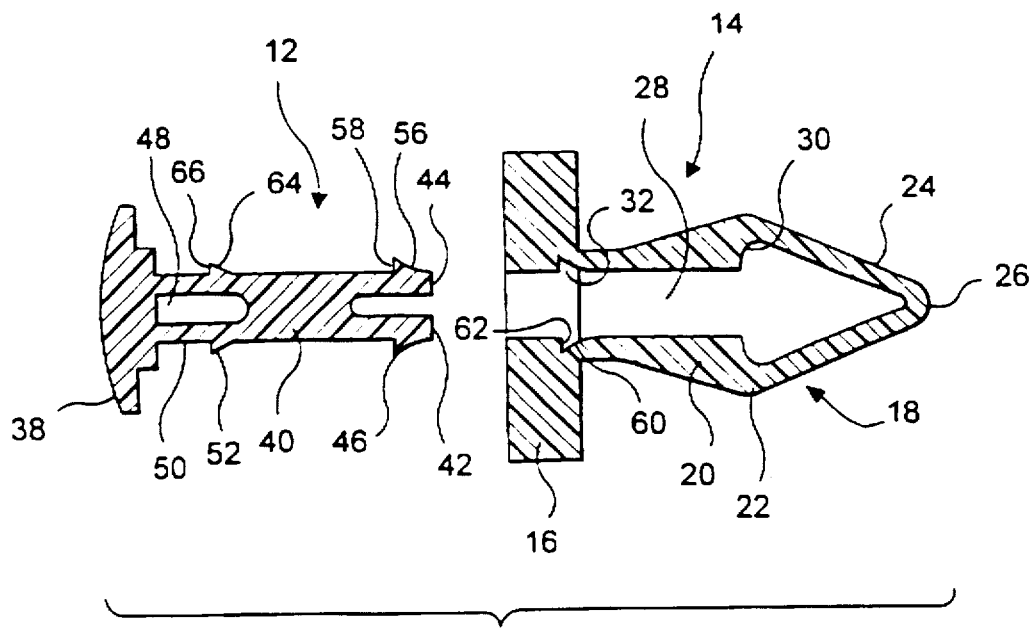
FIG. 2 is a cross-sectional view of the plastic rivet in an unassembled state.

As illustrated in FIG. 1, plastic rivet 10 has a drive pin 12 and a body 14. Body 14 has a head 16 integrally molded to an elongated portion 18. Elongated portion 18 has a pair of diametrically opposed longitudinal members 20 projecting from head 16. Longitudinal members 20 are tapered outwardly from the longitudinal axis of the body 14 and are interconnected at their respective distal ends 22 by nose 24. Nose 24 is tapered inwardly from the distal ends 22 of longitudinal members 20 to form a point 26. A longitudinal passage 28 extends through head 16, between longitudinal members 20 to point 26 of nose 24. Passage 28 is blind. That is, passage 28 does not extend through point 26 of nose 24. Thus, elongated portion 18 is closed and doubletapered. A pair of diametrically opposed mating surfaces 30 are formed at the connection of nose 24 and longitudinal members 20 as will be more fully described below. A pair of diametrically opposed slots 32 are molded into the longitudinal members 20 generally near the connection of the proximal ends of longitudinal members 20 to head 16. Elongated portion 18 is insertable into aligned holes 34 of members 36 to be joined such that head 16 abuts the outer of the members 36. Read 16 may be of any design which will permit head 16 to abut the outer of the members 36 without passing through holes 32.

Drive pin 12 has a head 38 integrally molded to a shank 40. Head 38 preferably has a circular shape. The distal end 42 of shank 40 includes a pair of diametrically opposed resilient legs 44. A protrusion 46 projects radially outwardly from each leg 44. Shank 40 of drive pin 12 includes a transverse hole 48. Transverse hole 48 preferably extends from the base of head 38 and preferably has a generally rectangular shape. Transverse hole 48 forms a pair of walls 50 in shank 40. A protrusion 52 projects radially outwardly from each wall 50, and protrusions 52 are generally positioned centrally along the length of transverse hole 48.

Drive pin 12 and body 14 are preferably integrally molded as one piece. Drive pin 12 and body 14 may be molded separately if so required by design constraints. Whether molded integrally or separately, drive pin 12 and body 14 are each composed of a resilient material, preferably nylon 6/6. If molded integrally as one piece, drive pin 12 and body 14 are connected by a frangible portion. Preferably, the frangible portion connects that distal end of drive pin 12 to the outer surface of head 16 of body 14.

Figure 3:
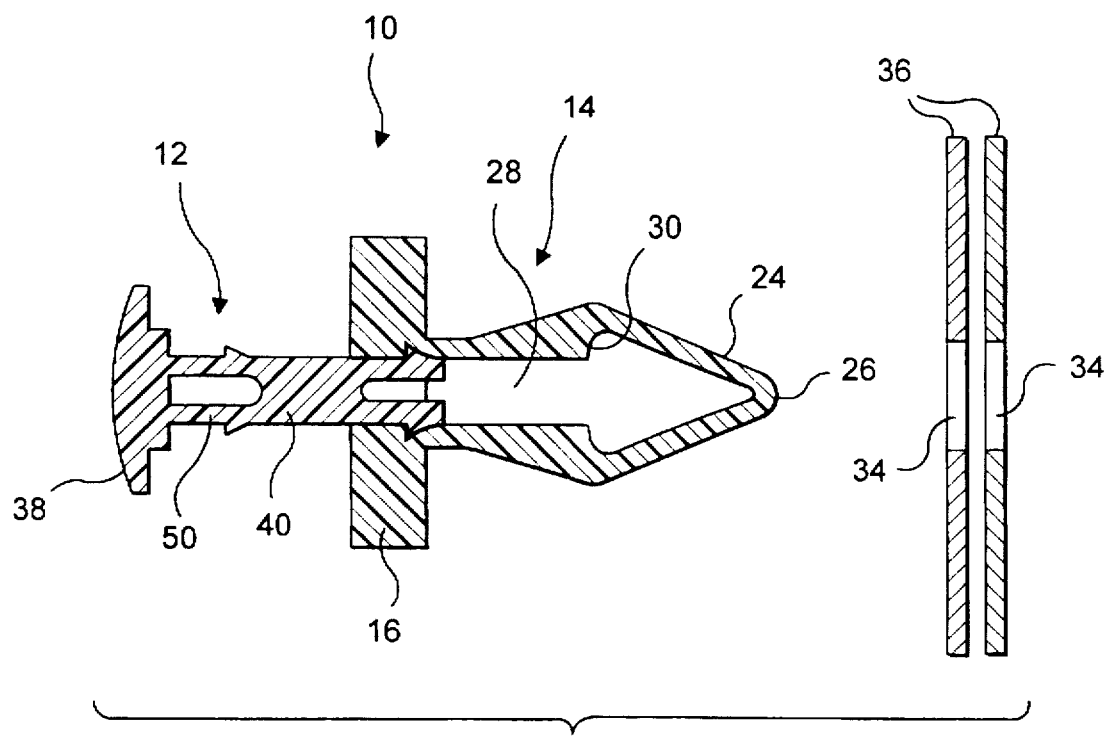
FIG. 3 is a cross-sectional view of the plastic rivet in a predriven state.
Figure 4:
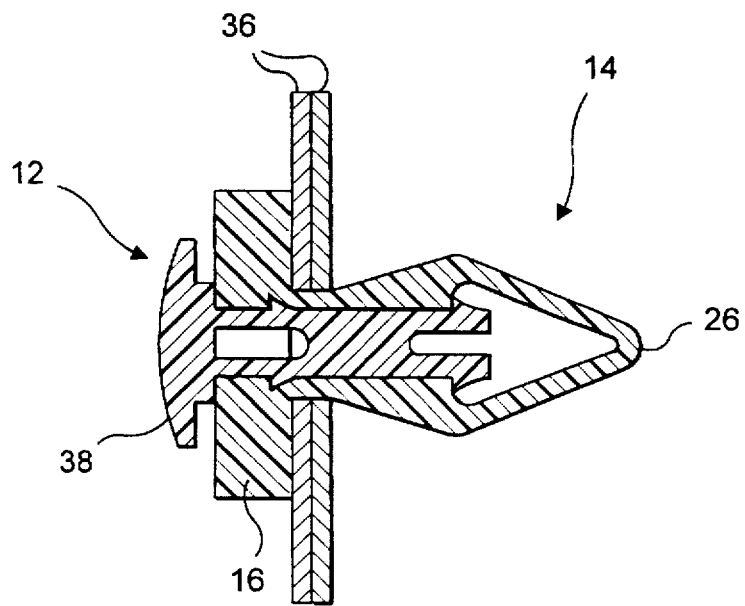
FIG. 4 is a cross-sectional view of the plastic rivet in a fully driven state.

Drive pin 12 is preferably predriven into body 14 as shown in FIG. 3. In the predriven state, drive pin 12 is partially driven into body 14 such that protrusions 46 are engaged into slots 32. Slots 32 and protrusions 46 may be of any design in which a high retention force will be imparted upon the mating surfaces of slots 32 and protrusions 46, thereby opposing the separation of drive pin 12 and body 14 during, for example, shipping and installation. As a result, assembly cost and time are reduced.

Protrusion 46 has a ramp 56 and a shoulder 58. The angle formed between ramp 56 and shank 40 should permit drive pin 12 to be inserted into and traverse passage 28 with a minimal amount of force. This angle is preferably between 15 and 20 degrees. Shoulder 58 forms the mating surface of protrusion 46 engageable with slot 32 when drive pin 12 is in a predriven state. The angle formed between shoulder 58 and shank 40 should impart a retention force between protrusion 46 and slot 32, thereby opposing removal of drive pin 12 from body 14. This angle is preferably 75 degrees to maximize the retention force between dive pin 12 and body 14. Similarly, protrusions 52 have a ramp 64 and shoulder 66, preferably of a substantially identical profile as protrusions 46.

Slots 32 have a ramp 60 and shoulder 62 to form a profile which generally complements the profile of protrusions 46 and 52. When in a predriven state, shoulder 66 abuts shoulder 62 forming the mating surfaces of slots 32 and protrusions 46. Mating surface 30 is preferably in the form of a shoulder which complements the profile of protrusions 46. It will be understood that design considerations may require other profiles of protrusion 46, protrusions 52, slots 32 and mating surfaces 30.

Body 14 is inserted into aligned holes 32 of members 36 to be joined so that the under surface of head 16 abuts the outer of members 36. Plastic rivet 10 is rated for a particular range of diameter of hole 34 to properly fasten members 36. In particular, the diameter of hole 34 of the inner of members 36 must be within the specified range. In the predriven state, longitudinal members 20 are tapered outwardly from head 16 such that the widest point of elongated portion 18 is located at the junction between longitudinal members 20 and nose 24. The widest point of elongated portion 18 is larger that the diameter of holes 34. When elongated portion 18 is inserted into holes 34, the sliding action of nose 24 into holes 34 causes longitudinal members 20 to be biased inwardly, thus reducing the effective diameter of elongated portion 18 and allowing elongated portion 18 to be fully inserted into holes 34. The resiliency of longitudinal members 20 return longitudinal members 20 to their respective predriven states once elongated portion 18 is fully inserted into holes 32 so that the underside of head 16 abuts the outer of members 36.

After elongated portion 18 has been fully inserted into holes 32, shank 40 of drive pin 12 may be driven into passage 28. As drive pin 12 is driven into body 14 from its predriven state, the sliding motion of ramp 56 of protrusions 46 relative to ramp 60 of slots 32 causes legs 44 to flex inwardly and longitudinal members 20 outwardly, thereby allowing further insertion of drive pin 12. Once drive pin 12 is driven into body 14 so that shoulder 58 traverses slot 32, legs 44 attain their highest degree of inward bias. The force resisting further insertion of drive pin 12 into body 14 is thus limited to the frictional force between protrusions 46 and longitudinal members 20 until protrusions 52 contact the top surface of head 16 of body 14. At this stage, further insertion of drive pin 12 into body 14 is opposed by protrusions 52. An increase in the insertion force causes ramps 64 of protrusions 52 to deflect walls 50 and, thus protrusions 52, radially inwardly until shoulders 66 traverse the outer surface of head 16 of body 14. The force resisting further insertion of drive pin 12 into body 14 is again reduced to the frictional force between protrusions 46 and protrusions 52 and longitudinal members 20. The maximum force necessary to fully drive the drive pin 12 into the body 14 from a predriven state for a plastic rivet in accordance with the present invention is typically less than ten pounds.

In its fully inserted position, the under surface of head 38 of drive pin 12 abuts the top surface of head 16 of body 14, protrusions 52 engage with slots 32 and protrusions 46 engage with mating surfaces 30 at the distal end 22 of longitudinal members 20. The engagement of protrusions 52 with slots 32 and protrusions 46 with mating surfaces 30 creates a double locking of drive pin 12 with respect to body 14. Thus, extraction of drive pin 12 from body 14 is opposed by a retention force. The cross-sections of longitudinal members 20 and shank 40 of drive pin 12 are such that a substantially solid member is formed when drive pin 12 is fully inserted into body 14. Longitudinal members 20 are thereby prevented from collapsing, thus opposing the extraction of body 14 from members 36.

It will be understood that design considerations may require only one set of protrusions 46 or protrusions 52. While plastic rivet 10 in accordance with the present invention may be used to fasten members 36, body 14 may be integrally molded into numerous designs requiring a fastener. Such designs include, but are not limited to, routing clips, brackets, hole plugs and decorative or functional covers.

Thus, the several aforementioned objects and advantages are most effectively attained. Although a single preferred embodiment of the invention has been disclosed and described in detail herein, it should be understood that this invention is in no sense limited thereby and its scope is to be determined by that of the appended claims.

I claims I claim:

1. A plastic rivet for securing two members by passing through an aligned hole in said members, said rivet being formed of a resilient material and comprising:

a drive pin having a head, a shank projecting from an under surface of said head and a first locking means located at a distal end of said shank; and a body having a head and an elongated portion, said elongated portion being insertable into said hole and having a plurality of longitudinal members projecting from an under surface of said head, said longitudinal members tapering radially outwardly from a longitudinal axis of said elongated portion, a distal end of each of said longitudinal members being interconnected by a nose, said nose tapering radially inwardly toward said longitudinal axis, a space between said longitudinal members defining a passage, said passage extending through said head, each of said longitudinal members including a first mating surface located at a proximal end and a second mating surface located at said distal end;

wherein said shank is partially insertable into said passage so that said first locking means engages with said first mating surfaces, imparting a retention force on said drive pin opposing said drive pin from being withdrawn from said passage;

wherein when said drive pin is fully inserted into said passage, said first locking means engages with said second mating surfaces, imparting a retention force on said drive pin opposing said drive pin from being withdrawn from said passage, said shank opposing said longitudinal members from being biased inwardly toward said longitudinal axis, thereby opposing said body from being withdrawn from said hole and, wherein a plurality of resilient legs project longitudinally from said distal end of said shank, said first locking means comprises a protrusion projecting radially outwardly from each of said legs, said body having a plurality of transverse slots defining said first mating surfaces, each of said distal ends of said longitudinal members having a shoulder defining said second mating surfaces, said legs being inwardly deflected while said drive pin is being driven into said body, said legs then relaxing when said drive pin is fully driven into said body.

2. The plastic rivet according to claim 1 wherein said body has two diametrically opposed longitudinal members and two diametrically opposed slots, and wherein said longitudinal members, said slots, said legs and said protrusions are aligned along said longitudinal axis.

3. The plastic rivet according to claim 2, wherein said drive pin and said body are integrally molded as one piece, said distal end of said drive pin being interconnected by a frangible portion to an outer surface of said head.

4. The plastic rivet according to claim 3, wherein said resilient material is nylon 6/6.

5. The plastic rivet according to claim 4, further comprising a fastening means integrally molded to said body.

6. The plastic rivet according to claim 1, further comprising a second locking means located at a proximal end of said shank, wherein when said drive pin is fully inserted into said passage said second locking means engages with said first mating surfaces.

7. The plastic rivet according to claim 6, wherein said shank has a transverse hole extending from said proximal end and forming a pair of walls, said second locking means comprising a protrusion projecting radially outwardly from each of said walls, each of said walls and said protrusions being inwardly deflected when said protrusions enter said passage, said walls then relaxing when said drive pin is fully inserted into said body.

* * * * *